United States Patent [19]

Toy

[11] 4,338,658

[45] Jul. 6, 1982

[54] MASTER-SLAVE HIGH CURRENT D.C. POWER SUPPLY

[75] Inventor: Samson K. Toy, Sunnyvale, Calif.

[73] Assignee: Boschert, Incorporated, Sunnyvale, Calif.

[21] Appl. No.: 263,430

[22] Filed: May 14, 1981

[51] Int. Cl.³ .................... H02J 1/10; H02M 3/335
[52] U.S. Cl. ........................................ 363/72; 363/17
[58] Field of Search ............................... 307/52–58, 307/64, 80, 81, 85; 363/17, 71, 72, 98

[56] References Cited

U.S. PATENT DOCUMENTS 4,174,534  11/1979  Kotlarewsky ..................... 363/72

Primary Examiner—A. D. Pellinen
Attorney, Agent, or Firm—Linval B. Castle

[57] ABSTRACT

A high current, low voltage, regulated D.C. power supply incorporating a parallel pair of bridges connected across a D.C. supply and each having alternately switched opposite legs for producing across its output a relatively high frequency A.C. to a stepdown transformer. Each of the bridges is switched out of phase with the other to minimize output ripple in the combined D.C. produced from rectifiers at the secondary of the stepdown transformers. Regulation of the supply is provided by a current sensor at the secondary of each transformer which produces a signal that is compared with a signal representing D.C. output level to alter the duty cycle in the switching circuitry to the parallel bridges. The novel feature is that the regulation control circuits of two or more identical supplies may be coupled to produce master-slave power supply combinations capable of greatly increasing the output power capabilities.

9 Claims, 2 Drawing Figures

MASTER-SLAVE HIGH CURRENT D.C. POWER SUPPLY

BRIEF SUMMARY OF THE INVENTION

This invention relates to low voltage high current regulated D.C. power supplies and in particular to master-slave supplies each comprising a high frequency, current mode, switched power supply that includes a parallel pair of identical power bridges controlled by switching circuitry operating 90° out of phase for maximum efficiency and minimum output ripple.

In the preferred embodiment, each power supply is designed to produce a D.C. output of approximately 1,500 watts at a regulated level that is adjustable in the range of approximately 5 volts. Each power supply in a master-slave pair includes a pair of identical power bridges, each connected across a D.C. source at approximately 300 volts. Each of the power bridge units is switched at a frequency of approximately 20 KHz to produce an A.C. output into a heavy duty step-down transformer, the output of which is rectified and combined with the rectified D.C. output from its adjacent parallel unit to produce the high current, low voltage output of the power supply. Each of the power bridge units is controlled by separate switching circuitry operating 90° out of phase which results in excellent line rejection and very low output ripple even with a relatively small output filter capacitor. The switching circuitry for each of the units is operated in a voltage controlled current mode which permits precise control of the switching currents over large line and load voltage ranges, including short circuits of the output.

An important feature of the power supply is that one complete power supply with its two identical phase shifted switching units can be connected to control several identical second, or slave power supplies so that each power supply will be equally voltage regulated and will equally share the total output current.

Briefly described, all supplies including the master and all slave supplies of the invention have an oscillator that drives the frequency divider and phase shifter which produces a pair of 90° displaced signals at a frequency of approximately 20 KHz to a pair of bridge drivers which alternately enable gates in the opposite diagonals of a pair of power bridges connected across a D.C. power source of approximately 300 volts. The resulting 300 volts, 20 KHz outputs of the power bridges are then transformed to the desired output voltage level, rectified, and connected together at the supply output terminals. The power supply D.C. output of the two units is sampled and compared with the reference voltage in an error amplifier so that, for a given output load current, a constant error voltage is produced. This error voltage is applied to a current comparator in each of the two identical units for comparison with D.C. signals representing load current and derived from the rectified outputs of small current transformers in series with the output of each unit's power bridge. The output from each comparator controls the on-off duty cycle of its respective unit to maintain the required voltage output level.

Parallel power supply or master-slave operation is achieved by disabling the output voltage-sensing error amplifier in the identical slave power supplies and coupling the output of the master supply's error amplifier to the inputs of each unit of the slave current comparators. When the output terminals of each supply are intercoupled, and the circuit grounds are interconnected, each of the two supplies will produce identical output voltages and will equally share the total current drawn by the load.

DESCRIPTION OF THE DRAWINGS

In the drawings which illustrate the preferred embodiment of the invention.

DETAILED DESCRIPTION

Figure 1:
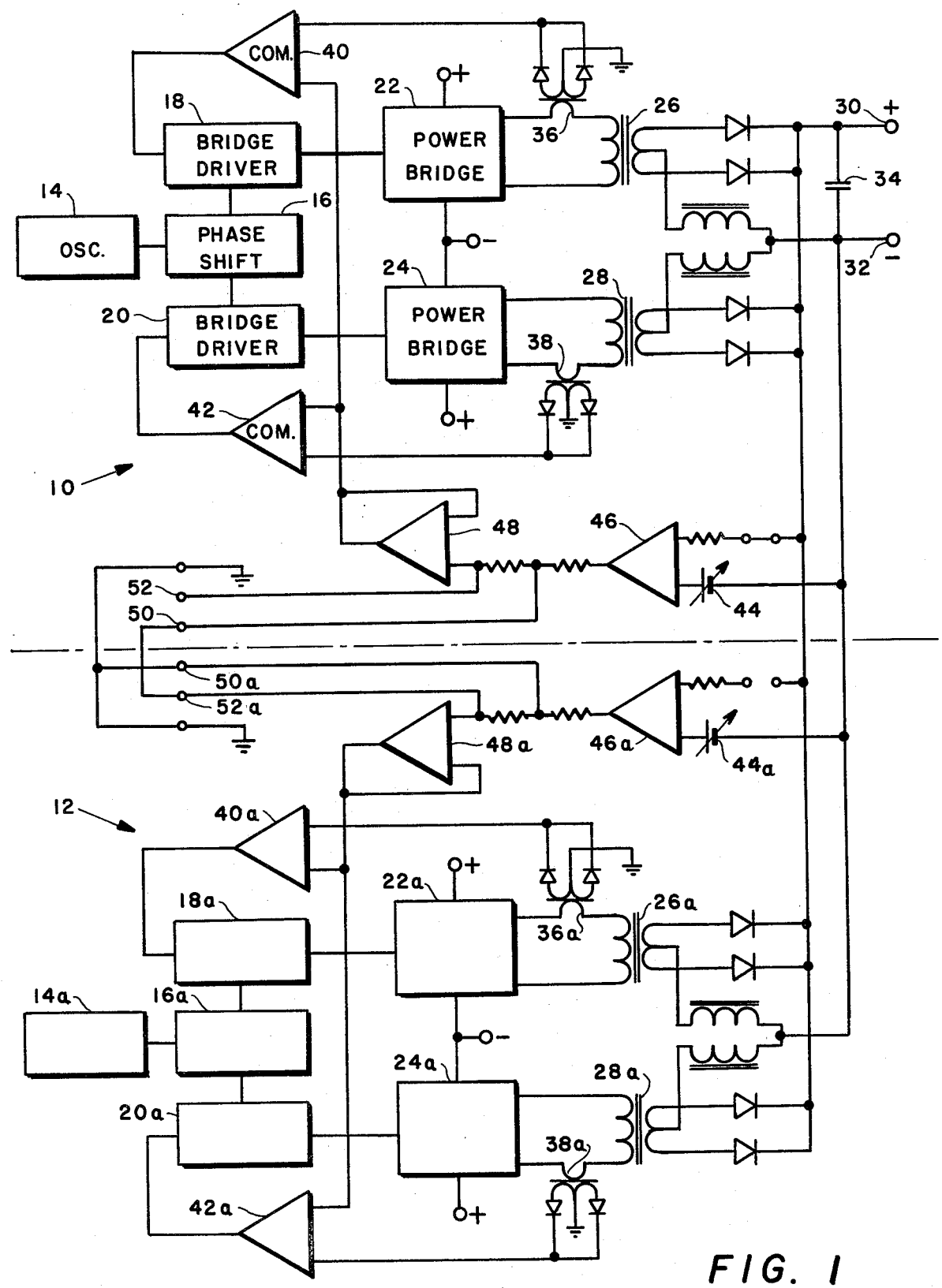
FIG. 1 is a block diagram of the regulated power supply coupled to an identical slave supply for doubling the output current capabilities.

FIG. 1 is a block diagram of two identical power supplies coupled together so that the output of the master supply 10 controls the operation of one identical slave supply 12. Since supplies 10 and 12 are identical, only the supply 10 will be described in detail and reference numerals assigned to the various components in the master supply 10 will be repeated with a postscript (a) for the identical components in the slave supply 12.

It will be noted that the master supply 10 is itself comprised of two identical channels, both of which are driven by a common oscillator 14 and phase shift circuit 16. As will be subsequently explained in connection with FIG. 2, oscillator 14 may operate at a frequency of approximately 80 KHz and its output applied to the phase shift circuit 16 is quartered in frequency and phase shifted to produce two 90° displaced output signals to the bridge drivers 18 and 20. Bridge driver 18 is coupled to the power bridge 22 which, as will be explained later, is a conventional bridge coupled across a D.C. potential of approximately 300 volts and contains transistor switches in each of its legs for producing an alternating A.C. output at a frequency of approximately 20 KHz. Similarly, the output of bridge driver 20 drives power bridge 24 which produces an A.C. output of approximately 20 KHz but displaced 90° in phase from the output signal of the power bridge 22. The A.C. output of the bridges 22 and 24 are transformed to the desired output voltage of, for example, 5 volts by transformers 26 and 28, respectively. The secondary voltages from transformers 26 and 28 are rectified and applied to the output terminals 30 and 32. Because of the 90° phase shift between the two channels of the supply 10, there is excellent line rejection and a very low output ripple even with a small output filter capacitor 34.

Output voltage control of the power supply operates in a current mode. The current output of each of the power bridges 22 and 24 is in series with the primary winding of current transformers 36 and 38, respectively. The signals developed in the secondary winding of the current transformer 36 are rectified and applied to one input of a voltage comparator 40, and the signals developed across the secondary of the transformer 38 is rectified and applied as one input to the comparator 42. The second input terminals of comparators 40 and 42 are coupled together and receive an "error" input signal, which is the difference between the voltage output signal at the positive output terminal 30 and an adjustable D.C. reference voltage indicated by the battery 44. Thus, a conductor from the positive output terminal 30 is applied to one input of an error amplifier 46, the other input to which is derived from the adjustable reference voltage source 44. The error signal output of the error amplifier is applied to buffer amplifier 48, the output of which is introduced to the comparators 40 and 42. The analog output signals from the current sensors 36 and 38 are compared with a control voltage on an instantaneous basis. When the current reaches the peak level corresponding to the load demand, the comparator changes state and initiates a turnoff signal to the respective bridge drivers 18 and 20 which, as will be subsequently described, remain off until the next pulse from the phase shift circuit 16 initiates the power bridge turn-on signal.

In the preferred embodiment of the invention the output of the error signal amplifier 46 is an internal comparator control signal and is brought to a terminal 50 in the power supply housing. The input signal to the error signal buffer 48 controls the operation of the comparators 40 and 42 and a paralleling input conductor to the input of buffer 48 originates at a terminal 52. If the power supply 10, which itself may produce an output in the order of 1,500 watts, is to be increased in capacity by connecting the supply 10 to a slave supply 12, it is only necessary to disconnect the output voltage sensing input to the error signal amplifier 46a of the slave unit 12, interconnect the signal ground circuits between the supplies 10 and 12, connect the internal control terminal 50 of the master supply 10 to the paralleling input terminal 52a of the slave unit 12, and ground the terminal 50a in the slave power supply. By connecting the master supply 10 with the slave supply 12 in this manner, the error amplifier 46 in the master supply 10 will provide the necessary comparator control to both the master supply 10 and the slave supply 12. The output voltages of each of the units 10 and 12 will be then identical and each will equally share the total load current.

Figure 2:
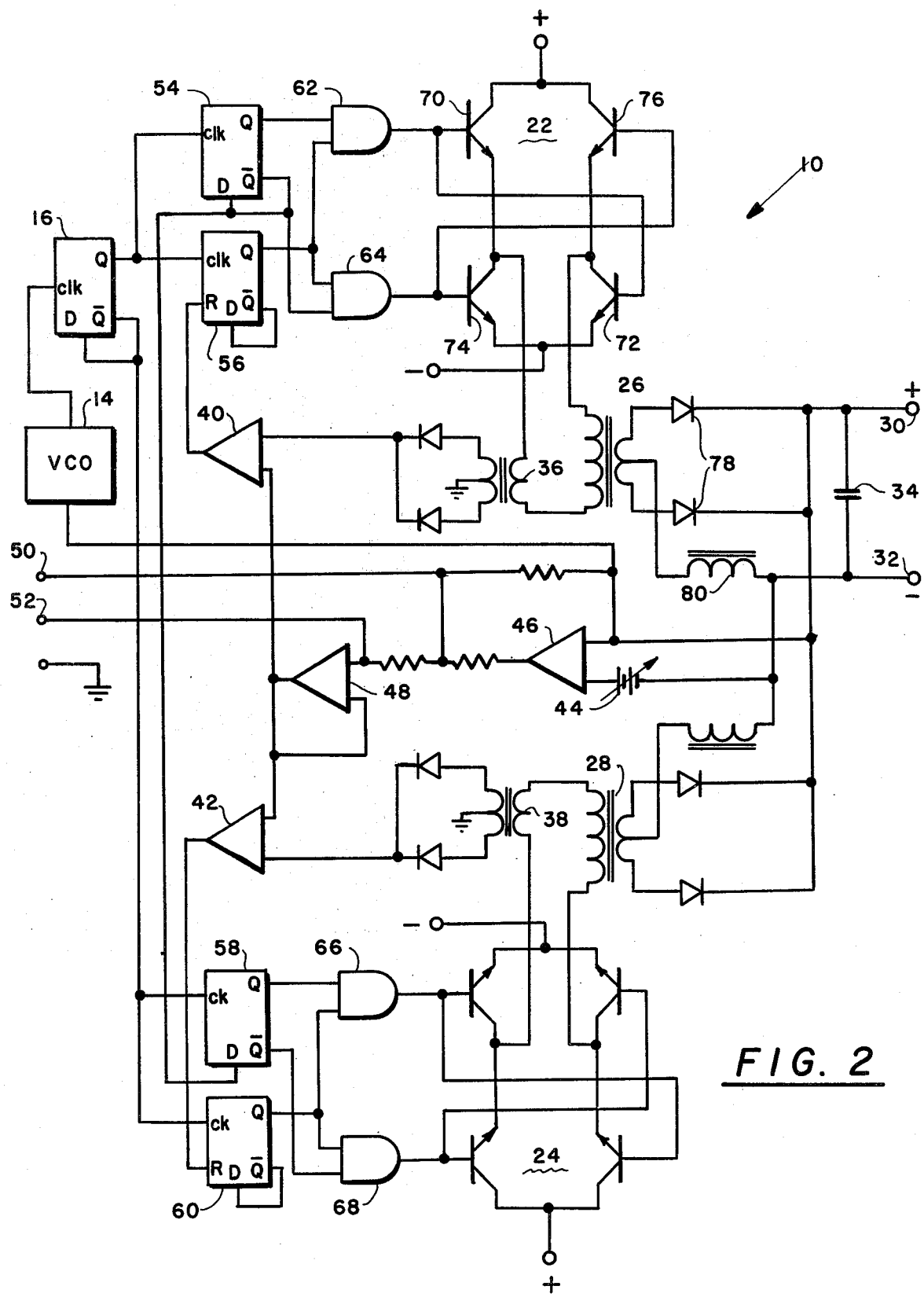
FIG. 2 is a circuit schematic diagram of either one of the power supplies of FIG. 1.

FIG. 2 is a circuit schematic diagram of one of the two identical power supplies, such as the master power supply 10, of FIG. 1. In the preferred embodiment of the invention, the oscillator 14 is a voltage controlled oscillator operating at a maximum frequency of approximately 80 KHz. The output of the oscillator 14 is applied to the clock input of flip-flop 16 whose Q output is applied to the clock inputs of the D flip-flops 54 and 56 whereas the false, or $\bar{Q}$ output of flip-flop 16 provides a clock input to the D flip-flops 58 and 60. The clock inputs of flip-flops 58 and 60 are therefore 180° displaced from the clock inputs to the flip-flops 54 and 56 and are thereby clocked at half the frequency of the oscillator 14, or at approximately 40 KHz.

Flip-flops 54 and 58 may be designated as "steering flip-flops" and the flip-flops 56 and 60 may be designated as "enabling flip-flops". Both steering flip-flops 54 and 58 and both enabling flip-flops 56 and 60 operate to respectively select one of two gates and to enable the selected gates. Thus, the true output of the steering flip-flop 54 is connected to an AND-gate 62 and the false output is connected to the AND-gate 64. Similarly, the true output of the steering flip-flop 58 is connected as one input to the AND-gate 66 and the false output to the AND-gate 68. It will be noted that the false output of the steering flip-flop 54 is also connected to its own D input and to the D input of the corresponding steering flip-flop 58 to thereby maintain a 90° phase relationship between the two identical channels of the power supply.

The true output of the flip-flop 56 is connected as the second input to the AND-gates 62 and 64. Similarly, the true output of the enabling flip-flop 60 is connected to the second inputs of the AND-gates 66 and 68. Therefore, the steering flip-flops 54 and 58 select which gate in the AND-gate pair 62, 64 and pair 66, 68, respectively, will be enabled and the enabling flip-flops 56 and 60 provide the necessary enabling signals as will be subsequently explained.

AND-gate 62 controls the conduction of the transistors 70 and 72 in the power bridge 22 and the AND-gate 64 controls conduction of the transistors 74 and 76. The power bridge 22 is a conventional bridge circuit having the switching transistors 70, 72, 74 and 76 in the respective bridge legs, with transistors 70 and 72 being in opposite diagonals of the bridge and transistors 74 and 76 similarly being in opposite diagonals in the bridge. The collectors of transistors 70 and 76 are connected together and to a source of D.C. power which, in the preferred embodiment, is at a level of approximately 300 volts. The collectors of transistors 74 and 72 are connected to the emitters of transistors 70 and 76, respectively, the collectors of which are connected together and to the negative D.C. source. The base elements of transistors 70 and 72 are connected together and to the output of the AND-gate 62, which thereby controls the current through opposite diagonals of the bridge and the base elements of transistors 74 and 76 are connected together and to the output of the AND-gate 64. The 20 KHz true output signal from the enabling flip-flop 56 therefore enables each of the AND-gates 62 and 64 to produce an output at the rate of 20 KHz. Thus, opposite legs of the bridge 22 are rendered conductive at this 20 KHz rate and the alternating output derived at the collector terminals of the transistors 74 and 72 is applied to the primary of an isolation step-down transformer 26. In series between one primary leg of the transformer 26 and the collector of transistor 74 is the primary of the current transformer 36 as previously discussed. The secondary windings of the step-down transformer 26 are connected to the anodes of diode 78, the cathodes of which are connected together and to the output terminal 30 of the system. A center tap in the secondary of the step-down transformer is connected through a suitable choke winding 80 and to the negative output terminal 32 of the power supply.

The circuitry of the second channel of the power supply is identical. The steering flip-flop 58 produces a 20 KHz output which selects which of the AND-gates 66 or 68 are to be enabled by the output from the enabling flip-flop 60. Each of the AND-gates 66 and 68 enable gating transistors in the opposite diagonals of the power bridge 24 which, as in the case of the bridge 22, is coupled across the D.C. power source of approximately 300 volts. The switched or A.C. output of the power bridge 24 is applied through the current transformer 38 to the primary of an isolation step-down transformer 28 similar in all respects to the transformer 26, and the output therefrom is rectified, filtered and applied to the supply output terminals 30 and 32.

The operation of the feedback circuit is identical with the operation of the circuitry explained in connection with FIG. 1, except that the D.C. output level is sampled and applied to control the frequency of the voltage control oscillator 14. The voltage control oscillator 14 normally runs at a constant frequency of 80 KHz to produce a constant switching frequency of 20 KHz under normal operating conditions. Under power-up conditions or under overloads, when the output voltage is outside of its normal range, the frequency developed by the oscillator 14 is proportional to the load voltage so that the oscillator 14 may vary to effectively increase or decrease the duty cycle range of the bridge drivers which include the flip-flops 54, 56, 58 and 60 and their associated AND-gates 62, 64, 66 and 68.

It will be noted that the output from the comparators 40 and 42 are applied to the reset input terminals of the enabling flip-flops 56 and 60. Thus, when the output of the current transformers 36 and 38 produce D.C. voltage signals that exceed the output of the buffer 48, the comparators 40 and 42 change state to reset the flip-flops 56 and 58, thereby turning off or disabling the signals to the respective AND-gates 64-68. This, of course, turns off the active power transistors in the power bridges 22 and 24 and they remain off until the next input clock pulse to the enabling flip-flops 56 and 60 initiates another power turn-on. The power transistors are therefore turned on synchronously by the oscillator 14, the drive signals being steered to the correct bridge transistors by the steering flip-flops 54 and 58 and at a frequency and duty cycle as determined by the enabling flip-flops 56 and 60.

Having thus described our invention, what is claimed is:

1. A high current regulated D.C. power supply comprising a master power supply and at least one slave power supply, the output voltages of said slave supplies being controlled by said master supply, and said slave supplies equally sharing the current load with said master supply, each of said master and slave supplies being identical and including:

first and second power bridges, each having input conductors coupled across a source of high voltage D.C. power and each having switching means in each diagonal leg;

first and second step-down transformers respectively coupled to the output conductors of said first and second power bridges;

first and second rectifying circuits respectively coupled to the secondary windings of said first and second step-down transformers, the output conductors of said first and second rectifying circuits being coupled together and to the output terminals of the D.C. power supply;

switching circuitry coupled to said switching means in each leg of said first and second power bridges, said switching circuitry alternately enabling said switching means in opposite diagonal legs of said first power bridge and 90 electrical degrees thereafter alternately enabling said switching means in opposite diagonal legs of said second power bridge; and error signal circuitry having a first input for sensing the output voltage level of said power supply and a second input for sensing an adjustable D.C. voltage reference, said error signal circuitry generating an output error signal representing the difference in levels between said output voltage and said reference voltage;

first and second current sensors associated with the secondary circuit of said first and second step-down transformers, said current sensors producing a D.C. output signal; and first and second signal comparators coupled to the output conductors of said error signal circuitry and said first and second current sensors, respectively, each of said comparators generating an instantaneous turnoff signal to its respective power bridge when current measured by its respective current sensor reaches a predetermined level;

the improvement comprising the method for intercoupling at least two of said supplies into a master and slave supply system, said intercoupling method including the steps of:

disconnecting the first input to said error signal circuitry in each selected slave power supply;

connect to ground said output error signals generated by said error signal circuitry in each of said slave power supplies;

interconnect the signal ground circuits of the master power supply and each of said slave power supplies;

connect the output from said error signal circuitry of said master supply to said first and second signal comparators of each of said slave supplies; and interconnect the D.C. output terminals of all said slave supplies and said master power supply.

2. The power supply claimed in claim 1 wherein said switching circuitry includes oscillating circuitry for generating first and second output signals, each of said signals being displaced 180° in phase from each other.

3. The power supply claimed in claim 2 wherein said switching circuitry includes a flip-flop clocked by a voltage control oscillator, the normal operating frequency of said oscillator being varied by corresponding variations in power supply output voltage.

4. The power supply claimed in claim 3 wherein said voltage control oscillator has a normal operating frequency of approximately 80 KHz.

5. The power supply claimed in claim 2 further including first and second power bridge driving circuits coupled between said oscillating circuitry and said first and second power bridges, respectively, each of said bridge driving circuits including a steering flip-flop for alternately selecting the opposite diagonal leg switching means to be enabled in its respective power bridge, and each of said bridge driving circuits including an enabling flip-flop for switching said selected opposite diagonal leg switching means.

6. The power supply claimed in claim 5 wherein said steering and enabling flip-flops in said first power bridge driving circuit are clocked by said first output signal of said oscillating circuitry, and wherein the steering and enabling flip-flops in said second power bridge driving circuit are clocked by said second output signals from said oscillating circuitry, whereby the output signals from said first power bridge driving circuits are displaced 90° from the output signals of said second power bridge driving circuit.

7. The power supply claimed in claim 6 wherein said instantaneous turnoff signals developed by each of said first and second signal comparators resets the enabling flip-flop in its respective power bridge driving circuit, said enabling flip-flop remaining off until occurrence of the next following clock input signal.

8. The D.C. power supply claimed in claim 1 further including a first circuit terminal coupled to the output conductor of said error signal circuitry, a second circuit terminal coupled to the error signal input conductor of said first and second signal comparators, and circuit opening means at said first voltage sensing input to said error signal circuitry.

9. The D.C. power supply claimed in claim 8 further including interconnecting means for controlling the operation of a slave power supply identical with said high current D.C. power supply for further increasing the output current capacity of said D.C. power supply, said interconnecting means including:

a first conductor interconnecting said first circuit terminal of said D.C. power supply with said second circuit terminal of said identical slave supply;

a second conductor interconnecting the signal ground conductors of said D.C. power supply and said slave power supply with the output conductor of the error signal circuitry of said slave supply;

means opening said circuit opening means at said first voltage sensing input to said error signal circuitry of said slave supply; and means interconnecting corresponding output conductors of said D.C. power supply and said slave supply.

* * * * *